358-69. OR 3,249,688 SR 1 6532

SEARCH ROOM

May 3, 1966 J. DAVIDSE ETAL 3,249,688

CIRCUIT ARRANGEMENT FOR USE IN COLOR-TELEVISION RECEIVERS

Filed Dec. 7, 1962 2 Sheets-Sheet 1

INVENTORS
JAN DAVIDSE &
B. H. J. CORNELISSEN
BY
Frank R. Jifani
AGENT

INVENTOR
JAN DAVIDSE
B. H. J. CORNELISSEN
BY
Frank R. Jifani
AGENT

United States Patent Office 3,249,688
Patented May 3, 1966

3,249,688
CIRCUIT ARRANGEMENT FOR USE IN COLOR-TELEVISION RECEIVERS

Jan Davidse and Bernardus Henricus Jozef Cornelissen, Emmasingel, Eindhoven, Netherlands, assignors to North American Philips Company, Inc., New York, N.Y., a corporation of Delaware Filed Dec. 7, 1962, Ser. No. 243,073
Claims priority, application Netherlands, Dec. 15, 1961, 272,586, 282,334
7 Claims. (Cl. 178—5.4)

This invention relates to circuit arrangements in color-television receivers for converting the incoming color television signal which has been detected once into a signal suitable for supply to a control electrode of a single-gun index tube. The tube has a viewing screen built up so that $1/k$ times as many index strips as groups of color strips are present. Run in index strips are provided on that side of the screen where the scanning of the color strips by the electron beam emitted by the gun begins, in front of the color strips. The spacing of the run-in strips differs from that of the index strips proper. The circuit arrangement also comprises means for producing two signals during the scanning of the two kinds of index strips, that is to say an index signal of frequency $f_i$ which is determined by the velocity at which the electron beam scans the index strips proper and an auxiliary index signal of frequency $f_h$ which is determined by the velocity at which the electron beam scans the run-in index strips. The two signals are applied to a division stage, and a plurality of mixing stages are provided for converting the index signal of frequency $f_i$ into a control signal of frequency $f_s=kf_i$ on which the color signals are modulated in the correct phase and which is suitable for application to a control electrode of the gun. At least some of the mixing stages, together with the division stage and the lead through which the index signal is applied to one mixing stage, constitute a *phase-compensating loop.*

Such a circuit arrangement has already been suggested.

The suggested circuit arrangement, although offering a possible solution, still suffers from a disadvantage, namely that the delay time of the phase-compensating branch proper must be comparatively long to realize the desired phase compensation for the output signal.

A long delay time in the phase-compensating branch is an important disadvantage. In fact, the phase compensation holds good only for the static case, that is to say a certain frequency deviation of the index signal is accompanied by a frequency deviation of the output signal. It is not until the frequency deviations at the input and the output are in agreement with each other (new static condition) that, due to the phase-compensating system, no phase error is present in the output signal anymore, so that correct color reproduction is possible only from this moment. However, it will be evident that it always takes some time before the new static condition has been established. The longer the total delay time of the circuit, the longer it takes before the new static condition is reached.

The delay time $T_1$ of the portion of the circuit from the index tube to the phase-compensating loop is usually determined, as well as the delay time $T_3$ of the portion of the circuit between the compensating loop and the input circuit of the index tube, and it is necessary for the delay time $T_2$ of the phase-compensating branch, belonging to the phase-compensating loop, to be matched to the delay times $T_1$ and $T_3$ for obtaining the desired phase compensation. The shorter $T_2$, the shorter the total delay time $T_1+T_2+T_3$ of the circuit and the more quickly a new static condition after a variation in index frequency is established, that is to say the shorter $T_2$, the more favourable the dynamic properties of the circuit.

An object of the invention is therefore to provide a circuit arrangement in which the delay time $T_2$ of the phase-compensating branch is reduced as far as possible.

To realize this, a circuit arrangement according to the invention is characterized in that the index signal, before being applied to the phase-compensating loop, first passes through at least one frequency-multiplier stage in which the frequency $f_i$ is multiplied by a factor $m$ ($m=2, 3, 4 \ldots$) and that the division stage divides the signal of frequency $m \cdot f_i$ by $n$, the dividend $n$ for a given value of $m$ being determined by the relation $$m\left(1-\frac{1}{n}\right)=k$$

and whereby the mixing stages for the color converting are solely in the phase compensating branch which is connected between the multiplier stage and the said one mixing stage and which also comprises said division stage. The higher the frequency-multiplication factor $m$, the shorter the delay time $T_2$ required.

If the color television signal which has been detected once is directly converted into a signal suitable to be applied to a control electrode of the single-gun index tube a further advantagement of the circuit arrangement of the present invention is that, the frequency multiplication of the index signal causes the frequencies applied to the various mixing stages to become more distant from one another, so that single mixing stages may be used and nevertheless filtering out of the unwanted frequency components is no longer a problem.

In the foregoing it has been explained that the higher the frequency-multiplication factor, the easier is the filtering out of the unwanted frequencies and the more favourable is the required delay time $T_2$. However, it will be evident that increasing said factor is bound to limits.

Firstly, the stage in which the frequency multiplication takes place becomes more complicated and hence more expensive as the multiplication factor increases.

Secondly, the required delay time $T_2$ is shortened, but since it has to be matched to the delay times $T_1$ and $T_3$, such matching would no longer be effective if the required value for $T_2$ would be unduly small.

In fact, it has in general been found that for minimum values of $T_1$ and $T_3$, the delay time $T_2$ has to be increased artificially to permit matching. However, if the required $T_2$ becomes so short that the delay time of the phase-compensating branch is by nature already longer than the value required, the delay times $T_1$ and $T_3$ would have to be increased so that the remedy is worse than the evil.

Thirdly, multiplying by an unduly high factor would raise the frequency of the multiplied index signal so that radiation on intermediate-frequency and/or high-frequency parts of the receiver is a problem.

The optimum result with direct conversion is found to be obtained if the multiplication factor is 2 and one index strip is provided after every two color strips so that $k=2/3$. In this case the required value for $T_2$ is found to be approximately equal to the natural delay time of the phase-compensating branch.

One embodiment of a circuit arrangement according to the invention for direct conversion is therefore characterized in that $m=2$ and $n=3/2$, the phase-compensating loop being constituted by the phase-compensating branch comprising in the sequence from input to output the division stage, a first, a second and a third mixing stage, and by a lead through which the multiplied index signal of frequency $2f_i$ is applied to the third mixing stage. The multiplied index signal is also applied directly to the division stage. The signal of frequency $\frac{4}{3}f_i$ derived from the division stage is applied to a first input terminal of the first mixing stage. The auxiliary carrier signal of frequency $f_r$ regenerated in the receiver is applied to a second input terminal of the first mixing stage. The output circuit of the first mixing stage includes a filter tuned to the frequency $\frac{4}{3}f_i \pm f_r$. The signal of frequency $\frac{4}{3}f_i \pm f_r$ derived from the first mixing stage is applied to a first input terminal of the second mixing stage. The color television signal which has been detected once in the receiver and which is modulated on the auxiliary carrier, with the carrier suppressed, is applied to the second input terminal of the second mixing stage. The output circuit of the second mixing stage includes a filter tuned to the frequency $\frac{4}{3}f_i$. The signal of frequency $2f_i$, and the color signal modulated on a signal of frequency $\frac{4}{3}f_i$ are applied to a third mixing stage. The output circuit of the third mixing stage includes a filter tuned to the signal frequency $f_s = \frac{2}{3}f_i$.

If, however, indirect conversion takes place, i.e. that the color-television signal detected once is first detected for the second time and then modulated on the converted index signal in mixing or modulator stages, the delay time $T_2$ may be shortened still further.

In order to achieve this, an embodiment according to the invention for indirect conversion is characterized in that the phase-compensating loop is constituted by the phase-compensating branch, comprising in the sequence from input to output the division stage, a phase-shifting network, the parallel combination of two push-pull mixing stages each having applied to it the color signals detected for the second time and a third mixing stage, and by a lead through which the multipled index signal of frequency $m.f_i$ is applied to the third mixing stage.

In order that the invention may be readily carried into effect, several embodiments thereof will now be described, by way of example, with reference to the accompanying diagrammatic drawings in which.

Figures 1, 2:
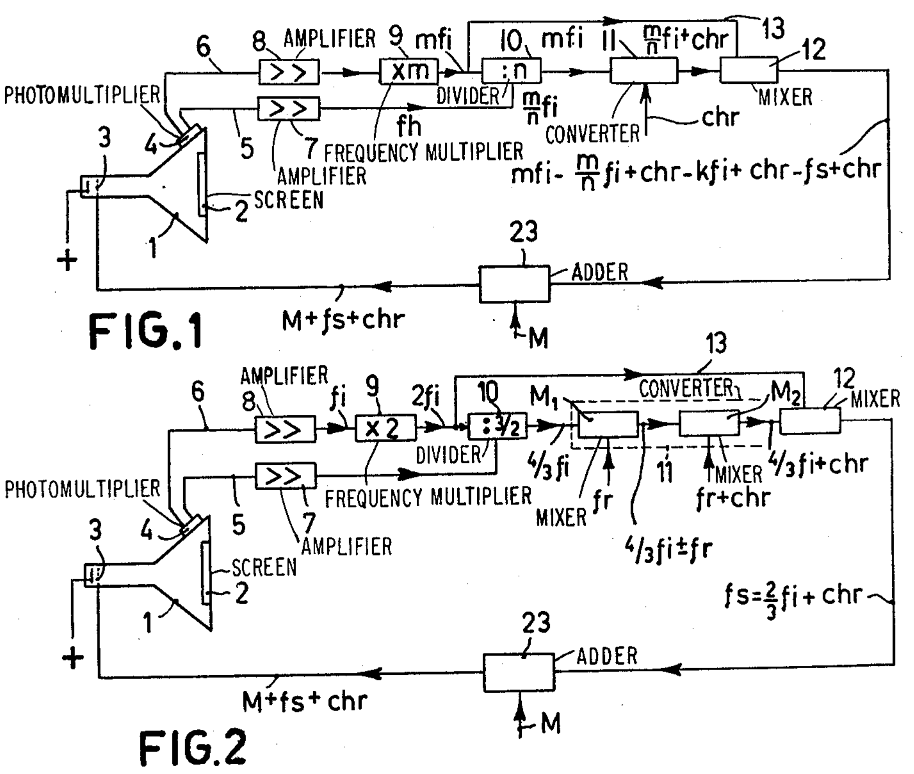
FIG. 1 shows a general embodiment in which the index frequency $f_i$ is multiplied by a factor $m$ and the division stage divides by $n$, the signal frequency being $f_s = k.f_i$.
FIG. 2 shows a special embodiment for direct conversion in which $m=2$, $n=\frac{3}{2}$ and $k=\frac{2}{3}$.

Referring now to FIGURE 1, the reference numeral 1 indicates a single-gun index tube having a screen 2 provided with color and index strips. As is well-known, the number of index strips is $1/k$ times larger than the groups of color strips to avoid crosstalk from the color signal on the index signal. Two possibilities are used in practice. Firstly that in which an index strip is provided after every two color strips. Since each group of color strips comprises three strips, that is to say a red strip, a green strip and a blue strip, there applies for this case $k=\frac{2}{3}$.

Secondly that in which an index strip is provided after every four color strips. In this case $k$ is equal to $\frac{4}{3}$. If the frequency of the index signal is indicated by $f_i$ and that of the control signal on which the color signals have to be ultimately modulated and which have to be applied to a Wehnelt cylinder 3 of tube 1 is indicated by $f_s$, then we have:

$$kf_i = f_s \qquad (1)$$

The signal of frequency $f_s$ may be derived from the signal of frequency $f_i$ inter alia by means of frequency division. To prevent variation in the phase of the index signal upon said division, the division has to be effected with the aid of a *run-in* index signal of frequency $f_h$.

Said run-in or auxiliary index signal is obtained by providing on that side of the screen where the horizontal scan by the electron beam in a direction at right angles to the direction of the index and color strips begins, a number of run-in index strips the spacing of which differs from that of the index strips proper which are provided together with the color strips. From this it follows that each time at the beginning of a horizontal scan a signal of frequency $f_h$ is produced, where $$f_h = \frac{1}{\delta} f_s$$

and $\delta$ is an integer. A photomultiplier 4 having two output terminals 5 and 6 is arranged on the index tube 1. In fact it is assumed that both the run-in strips and the index strips proper are composed of phosphors which emit ultra-violet light when struck by the electron beam. The photo-multiplier 4 must therefore be sensitive to ultra-violet light and at the beginning of a horizontal scan, when the electron beam scans the run-in index strips, a signal of frequency $f_h$ appears at each of the output terminals 5 and 6. An amplifier 7 only, to the input terminal of which the output terminal 5 is connected, is tuned to the frequency $f_h$ so that the amplifier 7 only passes this signal.

As soon as the scan of the index strips proper begins, a signal of index frequency $f_i$ appears at each of the two output terminals 5 and 6. Since an amplifier 8 only, to the input terminal of which the output terminal 6 is connected, is tuned to the frequency $f_i$, the amplifier 8 only passes this signal. The part of the circuit arrangement so far described does not form part of the invention and is intended only to give an insight in the obtainment of the signals of frequencies $f_i$ and $f_h$, which frequencies are required for a conversion of the signal of frequency $f_i$ into a signal of frequency $f_s$ in accordance with the invention. Consequently, for the inventive idea it is irrelevant how these two signals are obtained. Thus, for example, instead of using ultra-violet index strips, relatively through-connected index strips having a given secondary-emission coefficient may be employed. The said through-connection must then be coupled to the input terminals of the amplifiers 7 and 8.

Also the index strips proper may have variable widths so that the index signal obtained from photomultiplier 4 contains the frequency $f_i$ as well as the frequency $f_h$. Both frequencies are then amplified by their amplifiers 7 and 8 respectively so that during the whole scan of a line it remains guaranteed that the signal obtained after frequency division has the correct phase.

According to the invention the frequency $f_i$ of the index signal obtained from amplifier 8 is first multiplied by $m$ in a frequency-multiplier stage 9 before being converted into a control signal of frequency $f_s$.

Thus an index signal of frequency $m.f_i$ appears across the output of multiplier stage 9. This index signal is applied in the first place to a division stage 10 which divides the frequency $m.f_i$ by $n$ so that the signal across the output of division stage 10 has a frequency $m/n.f_i$.

In a device 11 a color signal *chr* is added to the last-mentioned signal which may take place in two difference ways.

In the case of direct conversion the device 11 comprises two mixing stages, in the first mixing stage of which the frequency $f_r$ of the auxiliary carrier signal is added to the frequency $m/n.f_i$, resulting in the frequency $m/nf_i + f_r$, in order to determine the desired phase relative to incoming color-signal $f_r + chr$ detected once. In the second mixing stage the color signal $f_r + chr$ is again subtracted therefrom. The output signal of the device 11 thus has a frequency $m/nf_i$ and contains any desired information about phase and color as indicated by $m/nf_i+chr$ in FIGURE 1.

It will be evident that a similar result is obtained if in the first mixing stage of device 11 the frequencies of the signals applied thereto are subtracted from each other (resulting in the frequency $m/nf_i-f_r$) and in the second mixing stage thereof the frequencies of the signals applied thereto are summated (resulting again in the signal $m/nf_i+chr$). As a further alternative, the color signal $f_r+chr$ may be applied to the first mixing stage and the auxiliary carrier signal to the second mixing stage.

In the case of indirect conversion the device 11 comprises two push-pull mixing stages or modulators to which the color signals detected for the second time are applied, as will be explained more fully with reference to FIGURE 5.

In the last mixing stage 12 the frequency $m/nf_i$ of the signal $m/nf_i+chr$ is subtracted from the frequency $m.f_i$ of the signal obtained through a lead 13 from the multiplier stage 9.

Due to all these mixing actions, the signal at the output of mixing stage 12 has finally obtained a frequency of $mf_i-m/nf_i$, which frequency must be equal to the signal frequency $f_s$. Consequently, according to Formula (1), it must be true that:

$$mf_i-m/nf_i=kf_i=f_s \qquad (2)$$

From Formula (2) it follows:

$$m\left(1-\frac{1}{n}\right)=k \qquad (3)$$

or $$\frac{m}{k}\left(1-\frac{1}{n}\right)=1 \qquad (3a)$$

The output signal of mixing stage 12, which is indicated by $f_s+chr$ in FIGURE 1, is then supplied to a summating stage 23 in which a monochrome signal M is added to the signal $f_s+chr$. The signal $M+f_s+chr$ obtained from summation stage 23 is suitable for direct supply to the Wehnelt cylinder 3 of the color display tube 1.

It is to be noted that, upon reception of a color television signal built up in accordance with the N.T.S.C.-system (National Television System Committee from the U.S.A.) it is preferably for the luminance signal Y present therein to be converted in known manner into a monochrome signal M and for the color signal proper to be converted into a so-called "dot-sequential" signal, which is indicated by $f_r+chr$. These are the signals which are applied to the summation stage 23 and the device 11 respectively.

As is well-known, the circuit arrangement must always include a so-called phase-compensating loop to prevent a variation in the index frequency $f_i$, resulting from variations in the horizontal deflection current, from causing phase errors in the control signal of frequency $f_s$.

In the circuit arrangement shown of FIGURE 1 said phase-compensating loop is constituted by the phase-compensating branch proper comprising the division stage 10, the device 11, the input portion of mixing stage 12, and the lead 13. Although in FIGURE 1 the multiplier stage 9 is shown in front of the phase-compensating loop, it will be evident that, if said multiplier stage is of the double type, one multiplier stage is included in the lead 13 and one in the phase-compensating branch. The latter multiplier stage may then be arranged either before, or after the division stage 10, since it is fundamentally immaterial whether the frequency $f_i$ is first multiplied by $m$ and then divided by $n$ or conversely. If division takes place first, followed by multiplication, a tube already present, for example, in the division stage 10 may bring about the multiplication so that in this case also single multiplier stage included in the lead 13 suffices.

The phase errors occurring in the circuit upon variation of the index frequency $f_i$ are caused by the delay times in the circuit which are dependent upon the filters employed therein.

In order to calculate the phase errors occurring in the various parts of the circuit, the following is assumed:

Firstly, the various delay times are assumed to be constant.

Secondly, it is assumed that the delay time of the portion of the circuit between the photomultiplier 4 and the input of the division stage 10 is $T_1$ sec., that from the output of division stage 10 up to and including the input of mixing stage 12 (hence that of the phase-compensating branch) is $T_2$ sec., and that from the output of mixing stage 12 up to and including the Wehnelt cylinder 3 is $T_3$ sec.

Thirdly, the delay time in division stage 10 is assumed to be zero. If this delay time differs from zero, it may be taken into account in the calculation in a similar manner as hereinafter.

On the above-mentioned assumptions it follows for any phase variations occurring due to variations in index frequency $f_i$.

For the portion from multiplier 4 to the input of stage 10.

$$\Delta\varphi_1=m\Delta\omega_i T_1=m\cdot\frac{1}{k}\Delta\omega_s T_1$$

In division stage 10 the phase variation $\Delta\varphi_1$ is also divided by $n$, so that the phase variation possible at the output of division stage 10 is:

$$\Delta\varphi_2=\frac{\Delta_i\varphi_1}{n}=\frac{m}{n\cdot k}\Delta\omega_s T_1$$

For the phase-compensating branch proper the possible phase variation becomes:

$$\Delta\varphi_3=\Delta\varphi_2+\frac{m}{n}\Delta\omega_i T_2=\frac{m}{nk}\Delta\omega_s T_1+\frac{m}{nk}\Delta\omega T_2$$
$$=\frac{m}{nk}\Delta\omega_s(T_1+T_2)$$

The signal of frequency $m.f_i$ is likewise obtained through the lead 13 from the multiplier stage 9. The possible phase variation of the signal is therefore $\Delta\varphi_1$. In the mixing stage 12 the frequency $$\frac{m}{n}f_i$$

of the signal $$\frac{m}{n}f_i+chr$$

is subtracted from the frequency $m.f_i$ of the signal applied through the lead 13, so that the phases of the two signals are also subtracted from each other. Thus, the possible phase variation at the output of stage 12 may be written as:

$$\Delta\varphi_4=\Delta\varphi_1-\Delta\varphi_3=\frac{m}{k}\Delta\omega_s T_1-\frac{m}{nk}\Delta\omega_s(T_1+T_2)$$
$$=\frac{m}{k}\Delta\omega_s\left\{\left(1-\frac{1}{n}\right)T_1-\frac{1}{n}T_2\right\}$$

Finally, for the possible phase variation of the portion of the circuit from the output of mixing stage 12 up to and including the Wehnelt cylinder 3 is found:

$$\Delta\varphi_5=\Delta\varphi_4+\Delta\omega_s T_3=\frac{m}{k}\Delta\omega_s\left\{\left(1-\frac{1}{n}\right)T_1-\frac{1}{n}T_2\right\}+\Delta\omega_s T_3 \qquad (4)$$

Since it is required that variations in the index frequency $f_i$ and the resulting variations in the signal frequency $f_s$ must not ultimately result in phase variations there must apply:

$$\Delta\varphi_5=0$$

From this it follows with the aid of Formulae (3a) and (4):

$$\frac{kn}{m}(T_1+T_3)=T_2 \qquad (5)$$

From Formula (5) it follows that, for constant values of $T_1$ and $T_3$, the delay time $T_2$ of the phase-compensating branch must satisfy Formula (5) to be certain that the said phase compensation is obtained.

It is to be noted that the Formulae (3) and (5) are deduced for a circuit arrangement in which the frequency $f_i$ of the index signal is multiplied before the index signal is applied to the division stage 10 and before it is applied through the lead 13 to mixing stage 12, that is to say the principle of the invention is based upon the recognition that the index frequency $f_i$ must be multiplied before applying the index signal to the phase-compensating loop.

The table below gives the values for $n$ and $T_2$ calculated with the aid of Formulae (3) and (5) for different values of the frequency-multiplication factor $m$.

TABLE

| $k=4/3$ | | | $k=2/3$ | | |
|---|---|---|---|---|---|
| $m$ | $n$ | $T_2$ | $m$ | $n$ | $T_2$ |
| 1 | $-3$ | $-4(T_1+T_3)$ | 1 | 3 | $2(T_1+T_3)$ |
| 2 | 3 | $2(T_1+T_3)$ | 2 | $3/2$ | $1/2(T_1+T_3)$ |
| 3 | $9/5$ | $4/5(T_1+T_3)$ | 3 | $9/7$ | $2/7(T_1+T_3)$ |
| 4 | $3/2$ | $1/2(T_1+T_3)$ | 4 | $6/5$ | $1/5(T_1+T_3)$ |

From this table the following conclusions may be drawn.

The solution with $m=1$ (no frequency multiplication) appears to be impossible for $k=4/3$ since a negative delay time $T_2$ is not realizable. True the frequencies could acquire the correct values by dividing by 3 in division stage 9 and adding instead of subtracting in mixing stage 12, but then it follows for $\Delta\varphi_4$ that the phase variations $\Delta\varphi_1$ and $\Delta\varphi_3$ must likewise be added together so that the desired phase compensation is not established.

With $m=1$ and $k=2/3$ it is found that the delay time $T_2$, which is concentrated substantially in the device 11 with its associated filters, has to be twice as long as the delay time of the remaining part of the circuit. As previously explained in the preamble, this means that for proper phase compensation it is necessary to increase artificially the transit time $T_2$ of the phase-compensating branch, for example by providing a retarding network, so that the total delay time $T_1+T_2+T_3$ is increased, which results in an unfavourable dynamic characteristic of the whole circuit.

The solution for $m=2$ and $k=4/3$ is, up to delay time $T_2$, identical with that for $m=1$ and $k=2/3$, so that this solution also suffers from the same disadvantages.

As may clearly be seen from the table, a further increase of $m$ results in a decrease of the required values for $T_2$. Thus, for example, for $m=4$ and $k=2/3$ the delay time $T_2$ need be only $1/5$ part of the remaining delay time. However, for direct conversion it is found that $1/5$ $(T_1+T_3)$ is already shorter than the natural value for $T_2$ so that in this case an increase of $T_1$ and $T_3$ would be necessary, which is objectionable since in this case the total delay time $T_1+T_2+T_3$ would again be increased.

Furthermore, in addition to this and other arguments mentioned in the preamble, the structure of the division stage 10 also plays a part. Thus, for $m=3$ and $k=4/3$ it is necessary that $n=9/5$; for $m=3$ and $k=2/3$ that $n=9/7$, and for $m=4$ and $k=2/3$ that $n=6/5$. Now, the last-mentioned dividends for $n$ are more difficult to realize in practice than a dividend $n=3/2$, since for control of the division stage 10 the auxiliary index signal of frequency $f_h$ is also available. Assumed that $k=2/3$, $\delta=3/2$ and $f_i=12$ mc./s., then $f_h$ is equal to 8 mc./s. If $m=2$, $m.f^1$ becomes 24 mc./s. If the division stage 10 is a regenerative divider, both the frequencies of 8 mc./s. and 16 mc./s. are present. The essential point therefore is whether the frequency of 16 mc./s. is derived for making the division stage 10 divide by $3/2$, or the frequency of 8 mc./s. is derived so that division stage 10 divides by 3.

From the foregoing it follows that, when taking into account the requirements to be imposed upon division stage 10 for direct conversion, the solution with $m=2$, $k=2/3$ and $n=3/2$ offers optimum possibilities. It is otherwise to be noted that this solution is substantially identical with the solution $m=4$, $k=4/3$ and $n=3/2$, since in this case the frequency $f_i$ of the index signal is half the frequency $f_i$ of the index signal with $k=2/3$. In fact, with $k=4/3$ the number of index strips present is half that with $k=2/3$. It is therefore more favourable to work with $k=2/3$ since the multiplication factor may then be 2 instead of 4 so that less severe requirements need be imposed on the multiplier stage.

An elaborated example of a circuit for direct conversion, in which $m=2$, $n=3/2$ and $k=2/3$, will now be described with reference to FIGURE 2 in which identical parts are indicated as far as possible in the same manner as in FIGURE 1. In this description the numerical values for the frequencies employed will also be given in order to make clear that the various frequencies are spaced apart by multiplication of the index frequency $f_i$ sufficiently far to enable working with single mixing stages.

The frequency $f_i$ of the index signal delivered by the amplifier 8 in FIGURE 2 is, for example, 12 mc./s., whereas the frequency $f_h$ delivered by amplified 7 may be 8 mc./s. If desired, $f_h=4$ mc./s. could be used, but in this case additional steps would have to be taken in division stage 10 to permit proper division by $3/2$ at this frequency.

Figure 3:
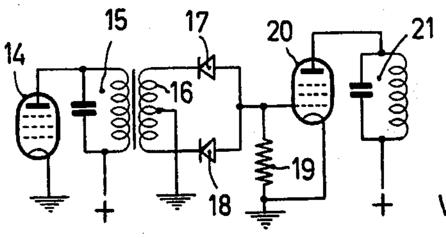
FIG. 3 shows an embodiment of a multiplier stage for multiplying the index frequency by a factor 2, and FIG. 4 serves to explain the multiplier stage shown in FIGURE 3.

The frequency $f_i$ is doubled in the multiplier stage 9 so that the signal at the output thereof has a frequency $2f_i=24$ mc./s. The doubling stage 9 may be designed, for example, as shown in FIGURE 3. In this figure a pentode tube 14 and a circuit 15, tuned to the frequency $f_i=12$ mc./s., represent the final stage of amplifier 8. The circuit 15 is coupled inductively to a winding 16 the centre tapping of which is connected to earth. One end of winding 16 is connected to the cathode of a diode 17 and its other end is connected to the cathode of a diode 18. The anodes of the two diodes are connected together and earthed through a resistor 19. The common point of the said two anodes may also be connected to a control grid of a pentode tube 20 the output circuit of which includes a circuit 21 tuned to the frequency $2f_i=24$ mc./s.

Figure 4:
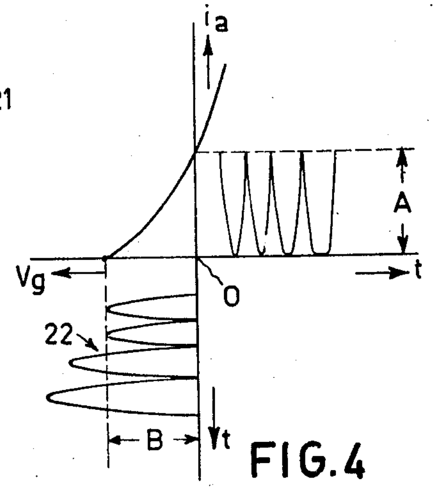

One half-wave of the signal of frequency $f_i$ renders conducting, for example, the diode 17 and the other half-wave the diode 18 (as it were full-wave rectification). A signal is thus set up across resistor 19 having a fundamental frequency double that of the signal applied to the tube 14. The anode current of tube 20 also contains this double frequency which is filtered out by the filter 21. Since the control grid of tube 20 is directly connected to the diodes 17 and 18, the D.C. component of the signal developed across resistor 19 is also active between the control grid and the cathode of tube 20. Thus, the grid-cathode portion of this tube also acts as an inertionless limiter since no reactances are present in the grid circuit (except very small parasitic capacitances and inductances). This clearly follows from FIGURE 4 in which the $i_a$—$V_g$ characteristic curve of tube 20 is shown, together with the signal 22 developed across resistor 19. Said signal is limited, on the one hand, by the cut-off voltage and, on the other, by the grid current of tube 20 so that the anode current $i_a$ can never exceed the amplitude A shown in FIGURE 4, provided that the minimum amplitude of signal 22 is equal to, or greater than, the value B.

The limitation free of inertia is important since the index signal may often greatly vary in amplitude, whilst the index signal ultimately to be used must have as constant an amplitude as possible, since otherwise unwanted luminance modulations of the control signal of frequency $f_s$ would occur. Furthermore the risk is then involved that the whole index loop would become instable and the circuit would start self-oscillating at its own frequency.

The doubled signal of the frequency of 24 mc./s. is divided by 3/2 in the division stage 10, resulting in a signal of the frequency $\frac{4}{3}f_i=16$ mc./s. This signal is applied to a first input terminal of the mixing stage $M_1$, to a second input terminal of which the regenerated auxiliary-carrier signal of frequency $f_r=4.5$ mc./s. is applied. In the mixing stage $M_1$, which forms part of the device 11, the frequencies $f_r$ and $\frac{4}{3}f_i$ respectively may be added together or subtracted from each other. In the first case the filter included in the output circuit of stage $M_1$ must be tuned to $\frac{4}{3}f_i+f_r=20.5$ mc./s. The frequency of 20.5 mc./s. is no harmonic of the frequencies of 16 mc./s. and 4.5 mc./s. applied to the stage $M_1$ and furthermore lies far enough from 16 mc./s. to permit the signal of the frequency 20.5 mc./s. to be filtered out with the aid of the filter included in the output circuit of stage $M_1$.

In the second case the filter in the output circuit of stage $M_1$ must be tuned to $\frac{4}{3}f_i-f_r=11.5$ mc./s. In this case also it is ensured that the desired signal in the output circuit may properly be filtered out.

The output signal from stage $M_1$ of the frequency $\frac{4}{3}f_i\pm f_r$ is subsequently applied to a second mixing stage $M_2$. This stage has also applied to it the converted color signal $f_r+chr$ the suppressed auxiliary carrier of which also has a frequency $f_r=4.5$ mc./s.

If in the stage $M_1$ the frequencies of the signals applied to it are added, the frequencies must be subtracted from each other in the stage $M_2$. In the opposite case they must be added in the stage $M_2$. In either case the following signal appears at the output of stage $M_2$:

$$\tfrac{4}{3}f_i+chr, \text{ in which } \tfrac{4}{3}f_i=16 \text{ mc./s.}$$

In the first case, signals of frequencies 20.5 mc./s. and 4.5 mc./s. are applied to the stage $M_2$, the latter of which is modulated and thus occupies a certain bandwidth. However, the output frequency of 16 mc./s. lies in this case also far enough from the applied frequencies to permit the output signal, despite the bandwidth requirement, to be filtered out with sufficient accuracy by means of the output filter in stage $M_2$ which is tuned to 16 mc./s.

The same holds good in the case where the frequencies of the signals applied to the stage $M_2$ are 11.5 mc./s. and 4.5 mc./s.

Finally, the doubled index signal of frequency $2f_i=24$ mc./s. and the converted color signal $\frac{4}{3}f_i+chr$ of the new auxiliary carrier frequency $\frac{4}{3}f_i=16$ mc./s. are applied to the stage 12. The output signal $\frac{2}{3}f_i+chr$ of stage 12 has the signal frequency $\frac{2}{3}f_i=f_s=8$ mc./s., which again lies far enough from the frequencies of 16 mc./s. and 24 mc./s. to ensure proper filtering of the desired signal. Higher harmonics are then not troublesome at all since both 16 mc./s. and 24 mc./s. are higher than 8 mc./s.

It will be evident that, in a similar manner as in the example of FIGURE 2, the frequencies may be calculated which appear at the inputs and outputs of the various stages in the circuit of FIGURE 2 if $m$ is a whole positive number larger than 2 with the associated dividends for $n$ (see also the table given hereinbefore). Also for values of $m>2$ the frequencies are usually so distant from one another that single mixing stages and associated filters suffice.

Although circuits have been described hereinbefore in which the device 11, which, as may be seen from FIGURE 2, always must comprise two mixing stages, is fully included in the phase-compensating branch, it is fundamentally also possible to provide the mixing stage $M_2$ between the mixing stage 12 and the summation stage 23. However, in this case, the delay time $T_2$ of the phase-compensating branch proper is reduced and the delay time $T_3$ increased. Since the relationship $$\frac{kn}{m}(T_1+T_3)=T_2$$

remains valid it follows that an increase of $T_3$ necessitates a reduction of $T_2$ and a subsequent artificial increase of $T_2$. The two mixing stages $M_1$ and $M_2$ are thus preferably included between the division stage 10 and the mixing stage 12, if at least the structure of all the mixing stages with their filters makes this possible.

As a matter of fact, other configurations are also possible. Thus, for example, one of the mixing stages $M_1$ and $M_2$ could be included in the lead 13.

Figure 5:
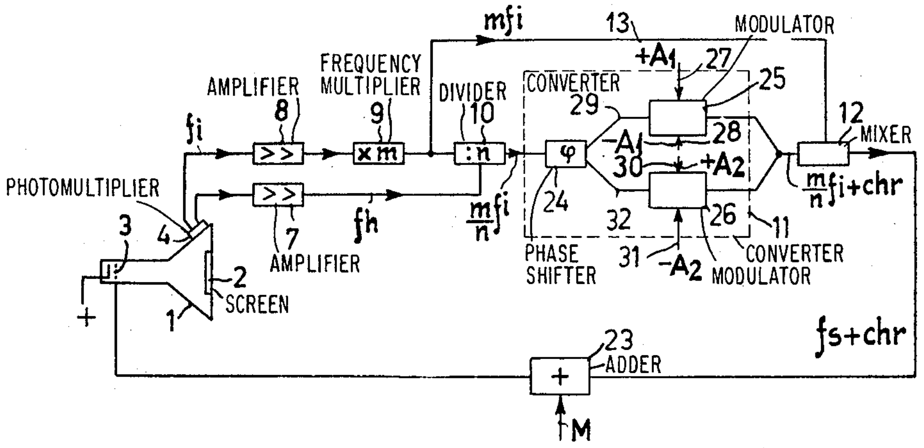
FIG. 5 shows a special embodiment for a direct conversion.

In the circuit arrangement shown in FIGURE 5 the device 11 comprises a phase-shifting network 24, together with two push-pull mixing stages 25 and 26. The mixing stage 25, which is actually designed as a push-pull modulator, has applied to it through a lead 27 the color signal $+A_1$ which has been detected twice and, through a lead 28, the color signal $-A_1$ which is similar, but in phase opposition to the first mentioned signal. This push-pull modulator has also applied to it two signals of frequency $$\frac{m}{n}f_i$$

through a lead 29, which is shown symbolically.

The same applies to push-pull stage 26. Two signals $+A_2$ and $-A_2$ of opposite phases are applied thereto through leads 30 and 31, which signals likewise represent color signals detected twice. This mixing stage has also applied to it two signals of frequency $$\frac{m}{n}f_i$$

through a lead 32 which is shown symbolically. The signals applied through the lead 32 are shifted in phase relative to those through the lead 29 because of the phase-shifting network 24.

The output signals of the stages 25 and 26 are added together through a common output filter (not shown) which is tuned to the frequency $$\frac{m}{n}f_i$$

That the desired output signal is actually obtained from said mixing stages may be clarified as follows: As is well-known (see the book "Prinicples of color television" written by K. McIllwain and C. E. Dean of the Hazeltine Laboratory, page 444, first paragraph and FIGURE 16–7) it is necessary, taking into account the angular frequencies $$\frac{m}{n}\omega_i=\frac{m}{n}2\pi f_i$$

that the dot sequential signal shall have the form $$0{,}89(R-Y)\cos\left(\frac{m}{n}\omega_i t-19°\right) + (0{,}74(B-Y)\sin\left(\frac{m}{n}\omega_i t-21°\right) \quad (6)$$

This implies that the color signal $A_1$ derived from a synchronous demodulator in the receiver must have the form $A_1=0{,}89(R-Y)$.

Since an incoming color signal modulated by the N.T.S.C. (National Television System Committee) system of the U.S.A. has the form $$\frac{R-Y}{1.14}\cos\omega_r t+\frac{B-Y}{2.03}\sin\omega_r t \quad (7)$$

where $\omega_r=2\pi f_r$ is the angular frequency of the incoming carrier wave, the desired signal $A_1$ may be obtained by applying to the said synchronous demodulator a signal of the form D cos $\omega_r t$ wherein it is necessary that $$D=\frac{0{,}89.1{,}14}{2}$$

Figure 6:
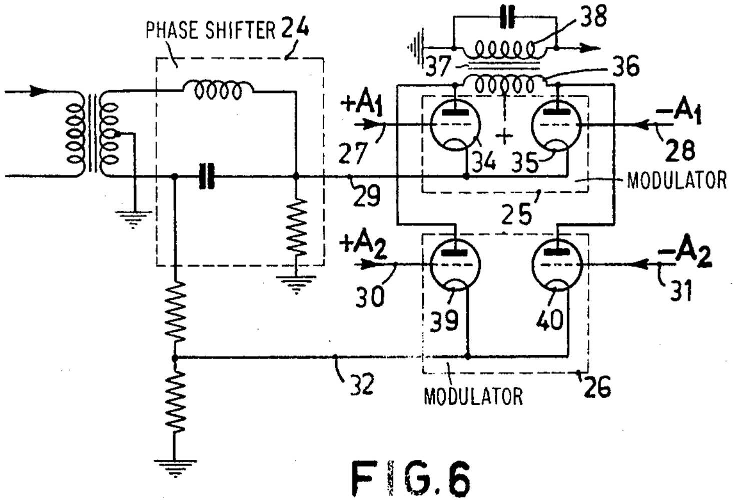
FIG. 6 shows a detailed diagram of push-pull modulators as used in the arrangement shown in FIG. 5.

As shown in FIGURE 6, the push-pull mixing stage 25 comprises two triodes 34 and 35 the anodes of which are connected together through the primary winding 36 of a transformer 37. A common filter 38, tuned to the frequency $$\frac{m}{n}f_i$$

is coupled inductively to the primary winding 36.

Between the control grid and the cathode of triode 34 there is applied the signal:

$$V_{g1}=A_1+\cos\left(\frac{m}{n}\omega_i t-19°\right)$$

and to the control grid of triode 35 the signal:

$$V_{g2}=-A_1+\cos\left(\frac{m}{n}\omega_i t-19°\right)$$

Assume the anode current of one triode to be given by $i_{a1}=\alpha V_{g1}+\beta V_{g1}^2$ and that of the other triode by $i_{a2}=\alpha V_{g2}+\beta V_{g2}^2$.

The voltage induced in filter 38 from the primary winding 36 is in the first place directly proportional to the difference between the anode currents $i_{a1}$ and $i_{a2}$ of the triodes 34 and 35, which difference is given by:

$$i_{a1}-i_{a2}=2\alpha A_1+4\beta A_1\cos\left(\frac{m}{n}\omega_i t-9°\right)$$

From Formula (6) it follows that the signal $A_2$ must have the form $A_2=0{,}74(B-Y)$.

The latter signal may be derived from a second synchronous demodulator to which the incoming color signal given by Formula (7) is applied, together with a signal of the form E sin $\omega_r t$ wherein it is necessary that $$E=\frac{0{,}74.2{,}03}{2}$$

The mixing stage 26, which is identical with the mixing stage 25, comprises triodes 39 and 40 the anodes of which are likewise connected together through the winding 36.

Between the control grid and the cathode of triode 39 there is applied a signal of the form:

$$V_{g1}=+A_2+\sin\left(\frac{m}{n}\omega_i t-21°\right)$$

and between the control grid and the cathode of triode 40 a signal of the form:

$$V_{g2}=-A_2+\sin\left(\frac{m}{n}\omega_i t-21°\right)$$

In a similar manner as for the stage 25 it may be calculated that the difference in anode current is given by:

$$i_{a1}^1-i_{a2}^1=2\alpha A_2+2\beta A_2\sin\left(\frac{m}{n}\omega_i t-21°\right)$$

wherein $i_{a1}^1$ and $i_{a2}^1$ are the anode currents of the triodes 39 and 40.

The voltage induced in the common filter 38 of the mixing stages 25 and 26 is also directly proportional to the difference between the anode currents of the triodes 39 and 40 and since this filter passes only the frequency $$\frac{m}{n}f_i$$

the signal developed across it is given by $$4\beta\cdot\Big\{0{,}89(R-Y)\cos\frac{m}{n}\omega_i t-19°)$$
$$+0{,}74(B-Y)\sin\left(\frac{m}{n}\omega_i t-21°\right)\Big\}\quad\cdot\cdot\cdot\qquad(8)$$

which is exactly the desired output signal given by Formula (6).

However, with this way of demodulating and modulating it is necessary for the required monochrome signal $M-Y$ to be produced in a separate synchronous demodulator to obtain, after adding the luminance signal Y, the signal M which must be applied to the summation stage 23. Consequently, in this case three synchronous demodulators are required.

However, the same result may be obtained if one of the three synchronous demodulators is omitted and one of the two remaining demodulators delivers the signal:

$$A_1=M-Y=0.19\frac{R-Y}{1.14}+0.55\frac{B-Y}{2.03}$$

(see Equation 16–9 on page 445 of the aforementioned book "Principles of Colour Television") and the other delivers the signal:

$$A_2=\delta(R-Y)+\epsilon(B-Y)$$

If the network 24 delivers for the mixing stage 25 a signal of the form:

$$\cos\left(\frac{m}{n}\omega_i t+\varphi\right)$$

and for the mixing stage 26 a signal of the form:

$$\sin\left(\frac{m}{n}\omega_i t+\varphi'\right)$$

then the total output signal becomes:

$$0.19\frac{R-Y}{1.14}\cos\left(\frac{m}{n}\omega_i t+\varphi\right)$$
$$+0.55\frac{B-Y}{2.03}\cos\left(\frac{m}{n}\omega_i t+\varphi\right)+\delta(R-Y)\sin\left(\frac{m}{n}\omega_i t+\varphi'\right)$$
$$+\epsilon(B-Y)\sin\left(\frac{m}{n}\omega_i t+\varphi'\right)\qquad(9)$$

The latter signal must be similar to that given by formula (6) so that the values $\varphi$, $\varphi'$, $\delta$ and $\epsilon$ may be calculated with it.

The signal $M-Y$ of the first-mentioned synchronous demodulator may now be used twice, namely one time for control of the stage 25 and the other time for supply, after adding the luminance signal Y, to the summation stage 23.

It is absolutely necessary for the mixing stages 25 and 26 to be designed as push-pull modulators since otherwise a colorless signal would not be reproduced without colors.

In fact, for a colorless signal the signals $A_1$ and $A_2$ are zero. If push-pull modulators were not used, an unmodulated component of frequency $$\frac{m}{n}f_i$$

could then penetrate to the Wehnelt cylinder 3, which means for the tube 1 that a color is displayed.

It is naturally also possible to choose other values for the demodulated signals $A_1$ and $A_2$ if, for example, the phosphor employed for reproducing the red, blue and green colors make this necessary.

It will also be evident that a circuit arrangement as shown in FIG. 5 may readily be used for the reception of a color signal built up in accordance with the French SECAM system. Only the demodulators which deliver the signals $A_1$ and $A_2$ have signals applied to them which differ from those occurring in the reception of an N.T.S.C. color signal.

With the aid of the Formulae (3) and (5) it may be deduced that $$T_2=\frac{k}{m-k}(T_1+T_3)\qquad(10)$$

Since the phase-compensating branch shown in FIGURE 5 includes only the dividend and the phase-shifting network 24, together with the filter tuned to the frequency $$\frac{m}{n}f_i$$

the delay time $T_2$ may be considerably shorter than in the case where two mixing stages are connected in series, as in FIGURE 2, each with their filters which may furthermore have much less broad bands than in the case of the stages 25 and 26.

The delay time $T_1+T_3$ varies, for example, from 0.50 $\mu$sec. to 0.66 $\mu$sec.

If the two mixing stages $M_1$ and $M_2$ are connected in series, is the case as in FIGURE 2, $T_2$ varies from 0.25 $\mu$sec. to about 0.30 $\mu$sec. In this case the condition $T_2=\frac{1}{2}(T_1+T_3)$ may be fulfilled if in Formula (10) it is assumed that $m=2$ and $k=\frac{2}{3}$ or $m=4$ and $k=\frac{4}{3}$.

When using the stages 25 and 26, as is the case in FIGURE 5, it is possible to reduce $T_2$ to about 0.10 $\mu$sec. In this case there applies $T_2=\frac{1}{5}(T_1+T_3)$, which condition is fulfilled if in Equation (10) it is assumed that $m=4$ and $k=\frac{2}{3}$. The total delay time thus becomes even more favourable in the last-mentioned case, which is beneficial to the dynamic properties of the receiver.

What is claimed is:

1. Means for converting the subcarrier frequency of color television signals modulated on a subcarrier wave for a television receiver of the type having a single beam indexing tube with an electron gun for modulating a scanning electron beam directed toward a screen, wherein said screen has a plurality of groups of parallel color strips, indexing strip means parallel with said color strips and within the area of said group, said receiver further comprising a source of said color television signals modulated on said subcarrier wave, and means for detecting the passage of said beam across said indexing strips to provide indexing signals, said means for converting the subcarrier frequency of said color television signals comprising means for frequency multiplying said indexing signals, means for dividing said frequency multiplied signals, converter means for converting said divided signals with said color signals, means for mixing the output of said converter means with said multiplied signals, and means applying the output of said mixing means to said electron gun, the frequency multiplying and dividing ratios of said frequency multiplying means and divider respectively being determined by the relationship:

$$m\left(1-\frac{1}{n}\right)=k$$

wherein $m$ is the multiplying factor of said frequency multiplying means, $n$ is the dividing ratio of said divider, and said screen has $1/k$ times as many index strips as groups of color strips.

2. Means for converting the subcarrier frequency of color television signals modulated on a subcarrier wave for a television receiver of the type having a single beam indexing tube with an electron gun for modulating a scanning electron beam directed toward a screen, wherein said screen has a plurality of groups of parallel color strips, indexing strip means parallel with said color strips and within the area of said group, said receiver further comprising a source of said color television signals modulated on said subcarrier wave, and means for detecting the passage of said beam across said indexing strips to provide indexing signals, said means for converting the subcarrier frequency of said color television signals comprising means for frequency multiplying said indexing signals, means for dividing said frequency multiplied signals, converter means for converting said divided signals with said color signals, means for mixing the output of said converter means with said multiplied signals, whereby said dividing means, converter means, and mixing means form a phase compensating loop, and means applying the output of said mixing means to said electron gun, the ratio $1/k$ of indexing strips to groups of color strips being determined by the relationship:

$$m\left(1-\frac{1}{n}\right)=k$$

wherein $m$ is the multiplying factor of said frequency multiplying means, and $n$ is the dividing ratio of said divider, and the delays of the system are expressed by the relationship:

$$\frac{kn}{m}(T_1+T_3)=T_2$$

wherein $T_1$ is the delay time of the portion of the system between said tube and the phase compensating loop, $T_2$ is the delay time in the phase compensating loop, and $T_3$ is the delay time between the output of said mixing means and the input circuit of said indexing tube.

3. Means for converting the subcarrier frequency of color television signals modulated on a subcarrier wave for a television receiver of the type having a single beam indexing tube with an electron gun for modulating a scanning electron beam directed toward a screen, wherein said screen has a plurality of groups of parallel color strips, indexing strip means parallel with said color strips and within the area of said group, said receiver further comprising a source of a reference carrier of the frequency of said subcarrier wave, a source of said color television signals modulated on said subcarrier wave, and means for detecting the passage of said beam across said indexing strips to provide indexing signals, said means for converting the subcarrier frequency of said color television signals comprising means for frequency multiplying said indexing signals by a multiplication factor $m$, means for dividing the output of said multiplying means by a dividing factor $n$, converter means connected to the output of said dividing means, mixing means, means for applying said multiplied signals and the output of said converter means to mixing means, and means applying the output of said mixing means to said electron gun, the ratio $1/k$ of indexing strips to groups of color strips being determined by the relationship:

$$m\left(1-\frac{1}{n}\right)=k$$

said converter means comprising a first mixer for mixing said reference carrier with the output of said dividing means, a second mixer for mixing the output of said first mixer with said color signals, and means applying the output of said second mixer to said mixing means.

4. The converting means of claim 3, in which $k=\frac{2}{3}$, $m=2$, and $n=\frac{3}{2}$, wherein a signal of frequency $\frac{4}{3}f_1$ derived from the output of said dividing means is applied to said first mixer, wherein $f_1$ is the frequency of said indexing signals, said first mixer having output filter means tuned to the frequency $\frac{4}{3}f_1 \pm f_r$, wherein $f_r$ is the frequency of said reference carrier, the output of said second mixer having a filter tuned to the frequency $\frac{4}{3}f_1$, the output of said mixing means having a filter tuned to the frequency $\frac{2}{3}f_1$.

5. The converting means of claim 4, in which said divider means, converter means, and mixing means comprises a phase compensating branch of a phase compensating loop, the delay time $T_2$ of said phase compensating branch being determined by the expression:

$$\frac{kn}{m}(T_1+T_3)=T_2$$

wherein $T_1$ is the delay time between that portion of the system between the indexing tube and the phase compensating branch, and $T_3$ is the delay time from the output circuit of said mixing means and said electron gun.

6. Means for converting the subcarrier frequency of color television signals modulated on a subcarrier wave for a television receiver of the type having a single beam indexing tube with an electron gun for modulating a scanning electron beam directed toward a screen, wherein said screen has a plurality of groups of parallel color strips, indexing strip means parallel with said color strips and within the area of said group, said receiver further comprising a source of a reference carrier of the frequency of said subcarrier wave, a source of said color television signals modulated on said subcarrier wave, and means for detecting the passage of said beam across said indexing strips to provide indexing signals, said means for converting the subcarrier frequency of said color television signals comprising means for frequency multiplying said indexing signals by a multiplication factor $m$, means for dividing the output of said multiplying means by a dividing factor $n$, converter means connected to the output of said dividing means, mixing means, means for applying said multiplied signals and the output of said converter means to mixing means, and means applying the output of said mixing means to said electron gun, the ratio $1/k$ of indexing strips to groups of color strips being determined by the relationship:

$$m\left(1-\frac{1}{n}\right)=k$$

said converter means comprising phase compensating means connected to the output circuit of said divider means, first and second push-pull modulators, means applying the output of said phase compensating means to said first and second modulators, means applying the outputs of said first and second modulators to said mixing means, means demodulating said color signals, and means for applying said demodulated color signals to said first and second modulators.

7. Means for converting the subcarrier frequency of color television signals modulated on a subcarrier wave for a television receiver of the type having a single beam indexing tube with an electron gun for modulating a scanning electron beam directed toward a screen, wherein said screen has a plurality of groups of parallel color strips, first indexing strip means parallel with said color strips and within the area of said group, and second indexing strips parallel with said color strips and located on the side of said area on which said beam starts each scanning line, said receiver further comprising a source of said color television signals modulated on said subcarrier wave, and means for detecting the passage of said beam across said first and second indexing strips to provide first and second indexing signals respectively of first and second frequencies respectively, said means for converting the subcarrier frequency of said color television signals comprising multiplying means for multiplying said first indexing signal by a multiplication factor $m$, dividing means for dividing the output of said multiplying means by a dividing factor $n$, means for applying said second indexing signal to said dividing means for controlling the phase of said dividing means, converter means, means applying the output of said dividing means and said color signals to said converter means to provide a converted signal, means applying said converted signal and the output of said multiplying means to mixing means, and means applying the output of said mixing means to said electron gun, the ratio $1/k$ of said first indexing strips to groups of color strips being determined by the expression:

$$m\left(1-\frac{1}{n}\right)=k$$

References Cited by the Examiner

UNITED STATES PATENTS

| | | | |
|---|---|---|---|
| 2,831,052 | 4/1958 | Boothroyd | 178—5.4 |
| 3,013,113 | 12/1961 | Sunstein | 178—5.4 |
| 3,041,392 | 6/1962 | Keiper et al. | 178—5.4 |

DAVID G. REDINBAUGH, *Primary Examiner.*

ROBERT SEGAL, *Examiner.*